May 5, 1964  T. S. AMLIE  3,131,565
MERCURY FILLED ANGULAR ACCELEROMETER
Filed Sept. 12, 1961
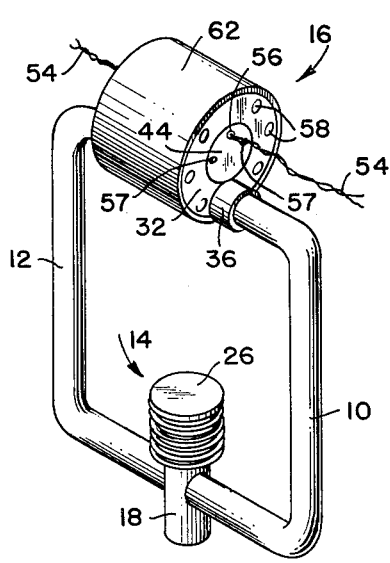
FIG. 1.
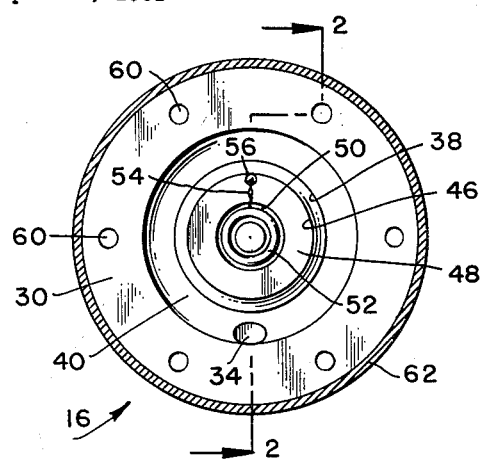
FIG. 3.
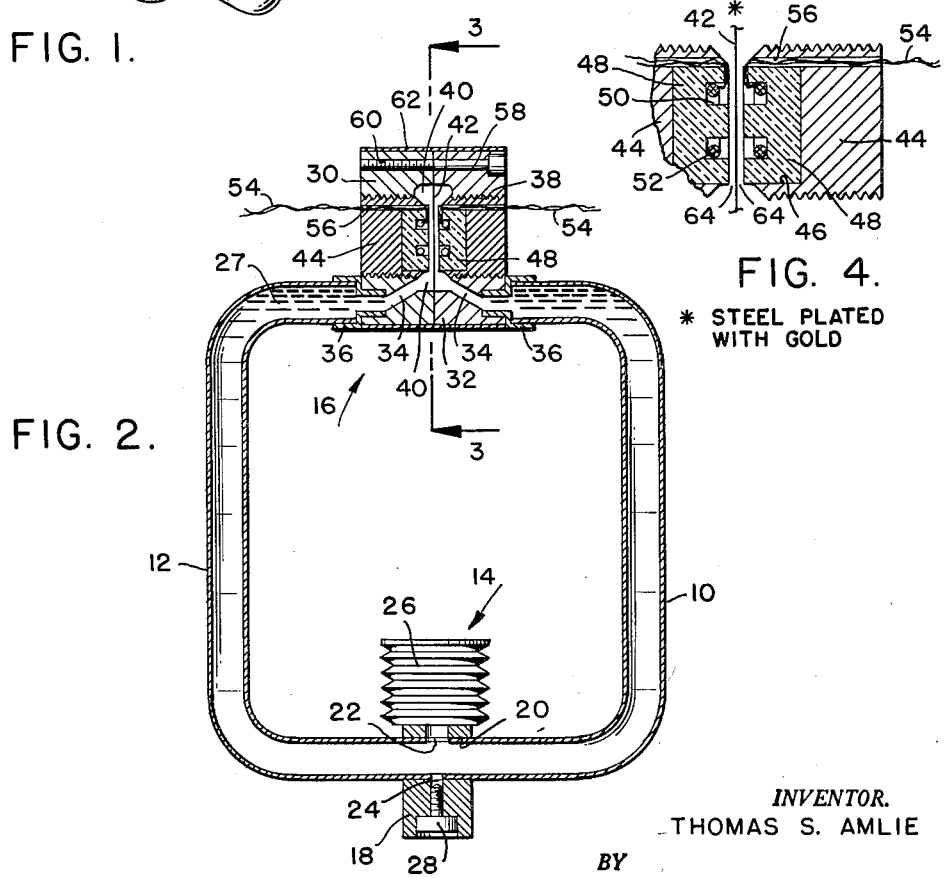
FIG. 2.
FIG. 4.
\* STEEL PLATED WITH GOLD
*INVENTOR.*
THOMAS S. AMLIE
BY
*P. H. Firsht*
ATTORNEY.

United States Patent Office 3,131,565
Patented May 5, 1964

3,131,565
MERCURY FILLED ANGULAR ACCELEROMETER
Thomas S. Amlie, China Lake, Calif., assignor to the United States of America as represented by the Secretary of the Navy
Filed Sept. 12, 1961, Ser. No. 137,705
5 Claims. (Cl. 73—516)
(Granted under Title 35, U.S. Code (1952), sec. 266)

The invention herein described may be manufactured and used by or for the Government of the United States of America for governmental purposes without the payment of any royalties thereon or therefor.

The present invention relates to accelerometers and more particularly to a mercury-filled angular accelerometer.

Those concerned with the use of angular accelerometers have long recognized that the devices available are much too large and, in general, do not have the required degree of isolation from linear acceleration. They are bulky and lack the required high resonant frequency. Typical accelerometers have a solid seismic mass suspended through its centroid by either bearings or some sort of flexure pivot. The pickoff is either a differential transformer or a potentiometer. Damping is provided by air dashpots, oil dashpots, or magnetic means. Miniature rate gyros are sometimes used but their output must be differentiated electronically because it is proportional to angular velocity and they are costly, short-lived and unreliable.

The general purpose of this invention is to provide an acelerometer which embraces all the advantages of similarly employed angular accelerometers and possesses none of the aforedescribed disadvantages. To attain this, the present invention is made of small size; it can be balanced very easily, and once balanced does not tend to shift; it has no moving parts except the mercury; and due to its simplicity is easy to fabricate and economical.

An object of the present invention is to provide a miniature rugged angular accelerometer which will measure small angular accelerations.

Another object is to provide an instrument for measuring angular accelerations in guided missiles.

A further object is to provide an accelerometer capable of measuring small angular accelerations, yet which is insensitive to large linear or translational accelerations.

Still another object is to provide an accelerometer which may be used to provide stabilizing signals for small air-to-air guided missiles.

Other objects, features and many of the attendant advantages of this invention will be readily appreciated as the same become better understood by reference to the following detailed description when considered in connection with the accompanying drawings in which like reference numerals designate like parts and wherein:

FIG. 1 is a perspective view of an angular accelerometer constructed in accordance with the present invention;

FIG. 2 is an enlarged sectional view of the accelerometer of FIG. 1, taken generally along line 2—2 of FIG. 3;

FIG. 3 is an enlarged sectional view taken just to the left of the diaphragm generally along line 3—3 of FIG. 2; and FIG. 4 is a fragmentary enlarged detail sectional view of a portion of the sensor assembly of the accelerometer.

The embodiment of the invention illustrated in FIG. 1 comprises two pieces of bent tubing 10, 12 joined together by a bellows assembly, generally designated by numeral 14, and a sensor assembly, generally designated by numeral 16, for forming a closed vessel system, more fully described hereinafter, which provides a closed path for mercury or other suitable fluid. The tubing is of stainless steel although it may also be of any other suitable material such as ceramic, glass or plastic.

The bellows assembly 14 comprises a fitting 18 having a through bore 20, a passageway 22 and a threaded port 24. Ends of tubing pieces 10, 12 are received in the bore 20 and secured therein, by cementing or the like, so as to be in communication with passageway 22 and port 24. Passageway 22 is in communication with the interior of a sylphon bellows 26 which functions as an expansion chamber. Port 24 is used for filling the closed vessel system with mercury or other fluid 27 and is provided with a threaded closure 28.

The sensor assembly 16 comprises a pair of mating cylindrical members 30, 32, each of which is formed with a passageway 34. Ends of the tubing pieces 10, 12 are joined to members 30, 32, respectively, by means of ferrules 36 which are secured to the respective members and tubing pieces by cementing or the like. The passageways 34 are formed with a cross-sectional area which is less than that of the tubing in order to provide restrictions for damping the system. The members 30, 32 are each provided with a central threaded bore 38 adjacent which are formed annular grooves or channels 40 (FIG. 3) which are in communication with the inner ends of the respective passageways 34.

Clamped between members 30, 32 is a thin steel diaphragm 42 of planar form which separates the annular channels 40 from each other. Threaded into bore 38, one from each end thereof, are a pair of threaded holders 44, each formed with a cup 46. Each of the cups 46 has secured therein, as by cementing or the like a cylindrically shaped cup core 48 of ferrite (ferromagnetic ceramic) material which is formed with an annular groove or channel 50, each such channel having a pick off coil 52 cemented therein by potting or the like. Wire leads 54 from the coils 52 extend to and across the peripheral edge of the respective cup core 48 and then through a hole 56 in holder 44 to the exterior, the cup cores having shallow grooves to receive the leads which are cemented therein. Each holder 44 is provided with a pair of diametrically opposed blind holes 57 adapted to receive projections on a spanner tool (not shown).

The cylindrical members 30, 32 are clamped together by means of a plurality of screws 58 screwed into threaded screw holes 60 formed in member 30. To seal the assembly a thin sleeve 62 (or several turns of glass tape) is cemented around the assembly and the whole covered with epoxy cement.

The threads of bore 38 and holders 44 are very fine for the purpose of finely adjusting the spacing of the faces of the cup from the diaphragm 42. The spacings or gaps 64 are about 0.002 inch and the cup cores are so adjusted that the inductances of the coils 52 are equal when the diaphragm is in its neutral unstressed position. If the diaphragm is moved to the right, the inductance of the right-hand coil will increase and that of the left hand coil will decrease; the reverse being true if the diaphragm is moved to the left.

In use, the coils 52 are connected in a balanced bridge arrangement (not shown) which is powered by a high frequency alternating voltage. If the balance of the bridge is upset by a change in the inductances there is a voltage output which is amplified and then detected by a suitable amplifier and phase detector. Very small diaphragm motions, of the order of a micro-inch, may be detected by this method.

After assembly, the accelerometer is baked in an oven to insure complete curing of the epoxy cement and to aid in outgassing or removing of any impurities. The filling port 24 is then connected to a high vacuum system for about eight hours to remove all air and gaseous impurities. A flask containing clean mercury is connected to the vacuum line to outgas the mercury. The accelerometer is very sensitive and any very small bubble of gas afffects insensitivity to linear acceleration and in filling the system it must be so positioned that the filling port is the highest point in the system. After filling, closure 28 is inserted and tightened, the threads thereof having previously been coated with a suitable sealing cement which seals the filling port.

An important feature of this invention is the diaphragm 42 which is of high quality thin steel. Steel, being less dense than mercury, tends to float in the mercury which produces an output in response to linear acceleration. To aviod this, the diaphragm is made neutrally buoyant by plating both sides thereof with a suitable thickness of gold, which is denser than mercury. A flash coating of rhodium is applied to the gold to prevent the mercury from amalgamating with the gold and carrying it away.

Another important feature of this invention is the manner by which the mercury is made to fill the system completely. Since one of the characteristics of mercury is that it does not wet most surfaces, it is very difficult to get it into capillaries and small interstices. In order to make the mercury completely fill the 0.002 inch spaces or chambers 64 between the diaphragm and the cup cores, a thin coat of gold is plated over the rhodium flash coats on the diaphragm and a thin coat of gold is vacuum deposited on the face of each cup core. Also, grooves or channels 40 provide a reservoir of mercury next to the gaps or chambers 64.

The accelerometer described thus far is composed of parts fabricated mainly from steel. However, it will be appreciated that where suitable, other material, such as ceramic, glass or plastic, could be used instead.

The accelerometer of this invention is so assembled that the tubing and passageways of the closed vessel system generally define a plane and the planar diaphragm 42 is disposed substantially perpendicular to the plane of the system and across the path of the mercury. The diaphragm is adapted to be flexed by the action of the mercury. In operation, when the system is subjected to an angular acceleration about an axis perpendicular to its plane, the mercury, because of its mass, resists being accelerated and produces a force against the diaphragm. The diaphragm deflects until its spring rate produces a force equal and opposite to the force exerted by the mercury on the diaphragm and the system is then in equilibrium. If the system is now decelerated, the mercury tends to keep moving and produces a force on the other side of the diaphragm. The deflection of the diaphragm may thus be used as a measure of the angular acceleration applied to the system. The mercury comprises a mass and the diaphragm acts as a spring. The stiffness of the diaphragm may be adjusted by changing the thickness of the steel used in fabricating the diaphragm. This allows control of the resonant frequency of the spring-mass system.

In an alternate form (not shown) use is made of the "Force-Balance" principle. In this form, the steel diaphragm is replaced with a very limber diaphragm such as .0005 inch Mylar film. Thin steel discs, plated with precious metal, are cemented to each side of the Mylar film. The variable reluctance pick-offs then serve a dual purpose. The A.C. output of the pick-off shows the deflection of the diaphragm. This output is amplified, phase detected and fed back to the pick-off as a D.C. signal to pull the diaphragm back to its center position. The pick-off then acts as both a position sensor and as a forcing mechanism on the diaphragm. The D.C. signal fed to the pick-off is proportional to the force required to hold the diaphragm centered and is thus a measure of the angular acceleration. This "Force-Balance" method has the advantage that there is no zero shift due to the diaphragm warping or taking a set such as there might be in the case of the all steel diaphragm. Damping is a little more easily controlled in this configuration in that electronic damping can be added into the feed-back loop.

Obviously many modifications and variations of the present invention are possible in light of the above teachings. It is therefore to be understood that the invention may be practiced otherwise than as specifically described.

What is claimed is:

1. In an acceleration device, a sensor assembly comprising a pair of sensing means, a steel diaphragm supported between said sensing means in spaced facing relation thereto, the spacings between said sensing means and diaphragm being on the order of a few thousandths of an inch, and mercury filling said spaces, said facing portions of said sensing means and said diaphragm carrying a layer of gold.

2. An acceleration sensing device, comprising; means forming a closed hollow loop generally defining a plane and adapted to be angularly accelerated about an axis perpendicular to said plane, means restricting a small cross-sectional area of said loop, said loop being filled with mercury, a steel diaphragm plated with gold to make it neutrally buoyant in mercury disposed in the restricted portion of said loop substantially perpendicular to said plane, said diaphragm being adapted to be flexed in a direction laterally of its plane and forming a barrier across the mercury of said loop, means providing chambers at opposite sides of said diaphragm about 0.002 of an inch wide, said chambers being gold plated and thereby adapted to amalgamate with said mercury to permit the filling of said chambers, pick-off coils disposed on opposite sides of said diaphragm adapted to produce an electrical signal in response to movement of said diaphragm in response to acceleration forces experienced by said mercury.

3. An angular accelerometer comprising two pieces of hollow steel tubing having mating restricted portions joined together by a sensor assembly and mating unrestricted portions joined together by a bellows assembly to form a closed loop generally defining a plane and adapted to be angularly accelerated about an axis perpendicular to said plane, said loop being filled with mercury, said sensor assembly comprising a pair of mating cylindrical members each of which is formed with a passageway in communication with the restricted portion of said tubing, a steel diaphragm clamped between said cylindrical members forming a barrier across said mercury, means providing cup cores on opposite sides of said diaphragm forming a channel therebetween, and a plating of gold on the facing portions of said cup cores and diaphragm to permit mercury to fill said channel, each cup core having a pick off coil secured therein and adapted to produce an electrical signal in response to pressure against said diaphragm in response to forces experienced by said mercury; said bellows assembly comprising a fitting having a through bore, a passageway and a threaded port adapted to receive the unrestricted portion of said tubing so as to be in communication with a Sylphon bellows which acts as an expansion chamber to assist in filling said closed loop with mercury.

4. An angular accelerometer comprising; in combination, a sensor assembly joining the ends of a loop of tubing, said assembly comprising a pair of matching cylindrical members each having a central bore therein, said members being disposed in end facing relation with the bores thereof aligned, each member at the inner facing end thereof being formed with an annular channel adjacent to the bore thereof and in communication therewith, each said member being provided with a passageway communicating the annular channel thereof with the respective end of said loop of tubing; a thin steel diaphragm plated with gold clamped between said members and providing a barrier between said channels, said gold plate being of suitable thickness for making the diaphragm neutrally buoyant in mercury, and a flash coating of rhodium over the gold; pick-off coil support means adjustably supported in each of said bores in closely spaced relation to said diaphragm; and mercury filling said tubing, passageways, channels and spaces between said diaphragm and pick-off coil support means.

5. The device of claim 4, wherein said rhodium coating and the portions of said pick-off coil support means facing said diaphragm are coated with gold.

References Cited in the file of this patent

UNITED STATES PATENTS

| | | |
|---|---|---|
| 2,404,179 | King | July 16, 1946 |
| 2,643,869 | Clark | June 30, 1953 |
| 2,983,149 | Lees | May 9, 1961 |
| 3,031,928 | Kopito | May 1, 1962 |
| 3,068,700 | Bourns | Dec. 18, 1962 |
| 3,098,393 | Cook | July 23, 1963 |

FOREIGN PATENTS

| | | |
|---|---|---|
| 661,864 | Germany | June 29, 1938 |